US012794187B2

(12) United States Patent
Hendrix et al.

(10) Patent No.: US 12,794,187 B2
(45) Date of Patent: Nov. 10, 2026

(54) CONNECTOR MODULES WITH STAGGERED CONNECTORS MOUNTED IN AN ENCLOSURE

(71) Applicant: viaPhoton, Inc., Aurora, IL (US)

(72) Inventors: Walter Mark Hendrix, Richardson, TX (US); Elizabeth Grace Dabdoub, Bartlett, IL (US)

( * ) Notice: Subject to any disclaimer, the term of this patent is extended or adjusted under 35 U.S.C. 154(b) by 1185 days.

(21) Appl. No.: 17/665,134

(22) Filed: Feb. 4, 2022

(65) Prior Publication Data

US 2022/0255259 A1 Aug. 11, 2022

Related U.S. Application Data

(60) Provisional application No. 63/146,237, filed on Feb. 5, 2021.

(51) Int. Cl.

| | |
|---|---|
| ***H01R 24/64*** | (2011.01) |
| ***G02B 6/44*** | (2006.01) |
| ***H01R 13/514*** | (2006.01) |
| ***H01R 13/518*** | (2006.01) |
| *G02B 6/00* | (2006.01) |
| *G02B 6/24* | (2006.01) |
| *G02B 6/36* | (2006.01) |
| *G02B 6/38* | (2006.01) |

(Continued)

(52) U.S. Cl.

CPC ......... *H01R 24/64* (2013.01); *G02B 6/44528* (2023.05); *H01R 13/514* (2013.01); *H01R 13/518* (2013.01); *G02B 6/00* (2013.01); *G02B 6/24* (2013.01); *G02B 6/36* (2013.01); *G02B 6/38* (2013.01); *G02B 6/3807* (2013.01); *G02B 6/389* (2013.01); *G02B 6/3893* (2013.01); *G02B 6/44* (2013.01); *G02B 6/4439* (2013.01); *G02B 6/444* (2013.01); *G02B 6/44526* (2023.05); *G02B 6/44529* (2023.05); *G02B 6/4454* (2013.01); *H01R 13/516* (2013.01); *H01R 13/7172* (2013.01)

(58) Field of Classification Search

CPC .... H01R 24/64; H01R 13/514; H01R 13/518; H01R 13/516; H01R 13/7172; G02B 6/44528; G02B 6/00; G02B 6/24; G02B 6/36; G02B 6/38; G02B 6/3807; G02B 6/389; G02B 6/44; G02B 6/4439; G02B 6/444; G02B 6/44526; G02B 6/44529; G02B 6/4454; G02B 6/3893

See application file for complete search history.

(56) References Cited

U.S. PATENT DOCUMENTS 7,194,178 B2 * 3/2007 Nakano ................ G02B 6/3807 385/134

2010/0054684 A1 * 3/2010 Cooke ................ G02B 6/44526 385/135

(Continued)

*Primary Examiner* — Justin M Kratt

(74) *Attorney, Agent, or Firm* — Ferguson Braswell Fraser Kubasta PC

(57) ABSTRACT

An apparatus implements a staggered connector. The apparatus includes a module base of a module, a first module connector within the module, and a second module connector, within the module, oriented with a side of the second connector corresponding to a release mechanism of a cable connector toward an opposite side of the first module connector. The apparatus further includes the second module connector staggered from the first module connector.

10 Claims, 11 Drawing Sheets

(51) Int. Cl.
*H01R 13/516* (2006.01)
*H01R 13/717* (2006.01)

(56) References Cited

U.S. PATENT DOCUMENTS

| | | | | |
|---|---|---|---|---|
| 2016/0085042 | A1* | 3/2016 | Lewis .................. | G02B 6/4453<br>385/135 |
| 2021/0409842 | A1* | 12/2021 | Takeuchi ........... | G02B 6/44528 |

* cited by examiner

CONNECTOR MODULES WITH STAGGERED CONNECTORS MOUNTED IN AN ENCLOSURE

CROSS-REFERENCE TO RELATED APPLICATIONS

This application claims the benefit of U.S. Provisional Application 63/146,237, filed Feb. 5, 2021, which is incorporated by reference herein.

BACKGROUND

Communication cables may be mounted into standard sized enclosures. A challenge is to increase the density of the connectors of the cables while maintaining accessibility to the connectors.

SUMMARY

In general, in one or more aspects, the disclosure relates to an apparatus implementing a staggered connector. The apparatus includes a module base of a module, a first module connector within the module, and a second module connector, within the module, oriented with a side of the second connector corresponding to a release mechanism of a cable connector toward an opposite side of the first module connector. The apparatus further includes the second module connector staggered from the first module connector.

In general, in one or more aspects, the disclosure relates to a method for a staggered connector. The method includes providing a module base of a module, providing a first module connector within the module, and orienting a second module connector, within the module, with a side of the second connector corresponding to a release of a cable connector toward an opposite side of the first module connector. The method further includes staggering the second module connector from the first module connector.

In general, in one or more aspects, the disclosure relates to a system. The system includes a panel of a rack, a module, a first module connector within the module, and a second module connector, within the module, oriented with a side of the second connector corresponding to a release mechanism of a cable connector toward an opposite side of the first module connector. The system further includes the second module connector staggered from the first module connector by a length exposing the release mechanism of the fiber connector.

Other aspects of the invention will be apparent from the following description and the appended claims.

DETAILED DESCRIPTION

Figure 1:
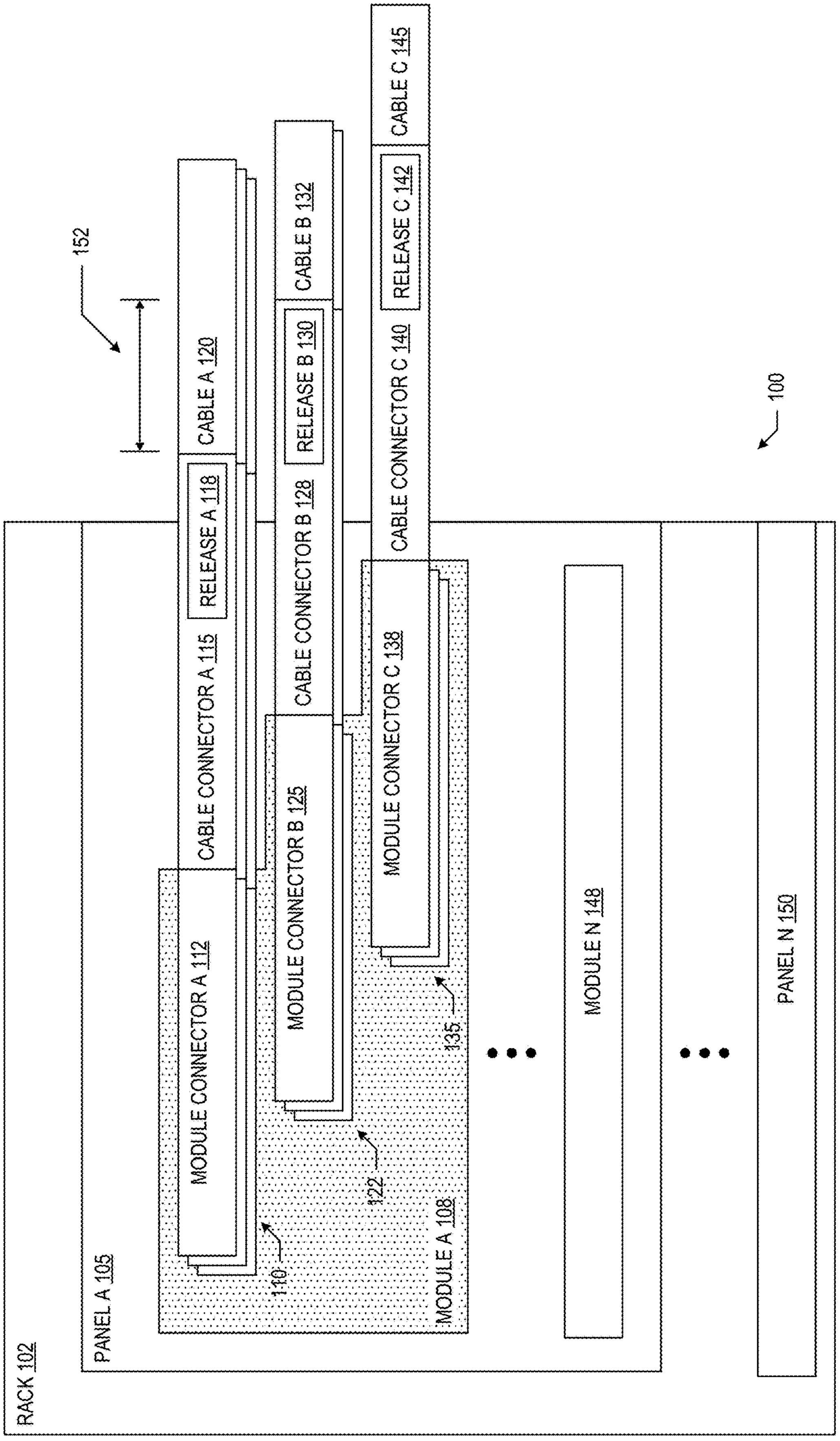
FIG. 1 shows a block diagram of a system in accordance with disclosed embodiments.

Specific embodiments will now be described in detail with reference to the accompanying figure. Like elements in the figure are denoted by like reference numerals for consistency.

In the following detailed description, numerous specific details are set forth in order to provide a more thorough understanding of the disclosure. However, it will be apparent to one of ordinary skill in the art that the disclosed embodiments may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure increase the number of cables serviceable with standard enclosures using modules. The modules may be configured for optical fiber cables, electrical cables, combinations thereof, etc. The modules may be configured as front-loading modules and rear-loading modules. The modules for optical fiber cables may include splices within the module.

The figures show diagrams of embodiments that are in accordance with the disclosure. The embodiments of the figures may be combined and may include or be included within the features and embodiments described in the other figures of the application. The features and elements of the figures are, individually and as a combination, improvements to the technology of cables, modules, and cable routing. The various elements, systems, components, and steps shown in the figures may be omitted, repeated, combined, and/or altered as shown from the figures. Accordingly, the scope of the present disclosure should not be considered limited to the specific arrangements shown in the figures.

Turning to FIG. 1, the system (100) implements staggered connectors. The staggered connectors enable access to the connectors of cables used by the system (100). The system (100) includes the rack (102).

The rack (102) is a standardized enclosure for mounting multiple equipment modules, including electrical and optical components. The rack (102) may be a 19-inch rack, a 23-inch rack, etc. The rack (102) includes the panels A (105) through N (150).

The panels A (105) through N (150) are enclosures for the modules A (108) through N (148) that route cables through the rack (102). The panel A (105) includes the modules A (108) through N (148). Each of the panels A (105) through N (150) may route and connect optical fiber cables, electrical cables, or both.

The module A (108) routes cable through the panel A (105) and include staggered connectors. The module A (108) includes the rows (110), (122), and (135) of module connectors. The module A (108) provides granular access to the cables connected to the panel A (105) and the rack (102) during service, maintenance, and installation.

Each of the rows (110), (122), and (135) includes a set of module connectors. The rows (110), (122), and (135) are staggered by the distance (152). In one embodiment, the distance (152) is about the length of a release (e.g., the release A 118)) and may be in the range of 0.5 to 1 inch. The stagger of the rows (110), (122), and (135) provides enough room for the releases B (130) and C (142) to be physically manipulated, even when the cable connectors A (115), B (128), and C (140) are each respectively connected to the module connectors A (112), B (125), and C (138). In one embodiment, the first row (110) and the second row (122) may include angular offsets to provide additional spacing to reach the cable connectors B (128) and C (140) and the releases B (130) and C (142). The rows (110), (122), and (135) respectively include the module connectors A (112), B (125), and C (138).

The module connectors A (112), B (125), and C (138) respectively receive the cable connectors A (115), B (128), and C (140). For example, the module connector A (112) receives the cable connector A (115). The module connectors A (112), B (125), and C (138) are standard connectors for connecting the cables A (120), B (132), and C (145) to the module A (108).

The cable connectors A (115), B (128), and C (140) are formed at the respective ends of the cables A (120), B (132), and C (145). The cable connectors A (115), B (128), and C (140) respectively include the releases A (118), B (130), and C (142). The cable connectors A (115), B (128), and C (140) are standard connectors for connecting the cables A (120), B (132), and C (145) to the module A (108) through the module connectors A (112), B (125), and C (138).

The releases A (118), B (130), and C (142) release the corresponding cables A (120), B (132), and C (145) from the module A (108). In one embodiment, the releases A (118), B (130), and C (142) include mechanical levers that, when pushed, release a catch to allow the removal of the cables A (120), B (132), and C (145) from the module A (108).

The cables A (120), B (132), and C (145) carry power and data. The cables A (120), B (132), and C (145) may include electrical cables, fiber optic cables, etc. The power and data signals carried by the cables A (120), B (132), and C (145) may be routed into the rack (102) through the panel A (105) and the module A (108) and then out through the module N (148) or the panel N (150).

Figure 2:
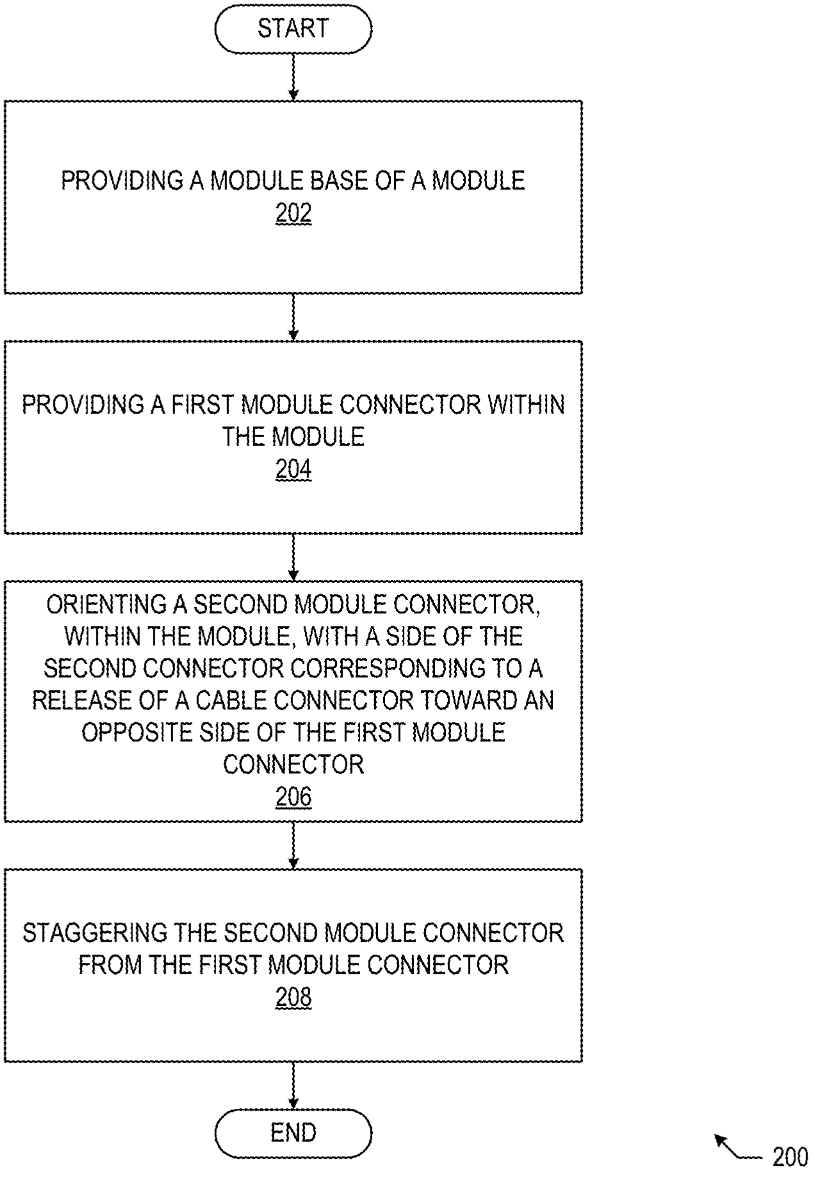
FIG. 2 shows a flowchart in accordance with disclosed embodiments.

Turning to FIG. 2, the process (200) is a method of manufacturing staggered connectors. The staggered connectors are formed in modules.

At Step 202, a module base of a module is provided. The module base may be made from sheet metal, plastic, etc. The module base supports the components of the module.

At Step 204, a first module connector within the module is provided. The module connector may be formed from plastic and include components used to transmit power or data, include electrical wires, optical fibers, etc. The first module connector may form part of a first row of module connectors.

At Step 206, a second module connector, within the module, is oriented with a side of the second connector corresponding to a release of a cable connector toward an opposite side of the first module connector. The second module connector may form part of a second row of module connectors. In one embodiment, the cable connector connects one of a fiber optic cable and an electrical cable to the second module connector.

At Step 208, the second module connector is staggered from the first module connector. The second row of module connectors may be staggered from the first row of module connectors. In one embodiment, the second module connector is staggered from the first module connector by a length exposing the release mechanism of the fiber connector.

In one embodiment, a restraint plate, of the module, is provided. The restraint plate may be provided between a first row (having the first module connector) and a second row (having the second module connector).

In one embodiment, a rear connector of the module is provided. The rear connector may route wires and fibers into and out of a rear end of the module.

In one embodiment, the module is connected to a panel. The panel may be installed into a rack.

In one embodiment, a first row (with the first module connector) is offset with a first angular offset. The first angular offset may be a pitch angle that is greater than about one degree. The pitch angle identifies a pitch of the connectors of the first row. The pitch may be with respect to another row of connectors that does not have an angular offset.

In one embodiment, a second row (with the second module connector) is offset with a second angular offset. The second angular offset may be less than the first angular offset of the first row. In one embodiment, the second angular offset is a pitch angle that is about half of the pitch angle of the first angular offset.

In one embodiment, a fastening point of the module base is aligned with a fastening point of a first restraint plate and with a fastening point of a second restraint plate. A fastener may by inserted through the fastening points of the restraint plates and secured to the fastening point of the module base.

Figure 3A:
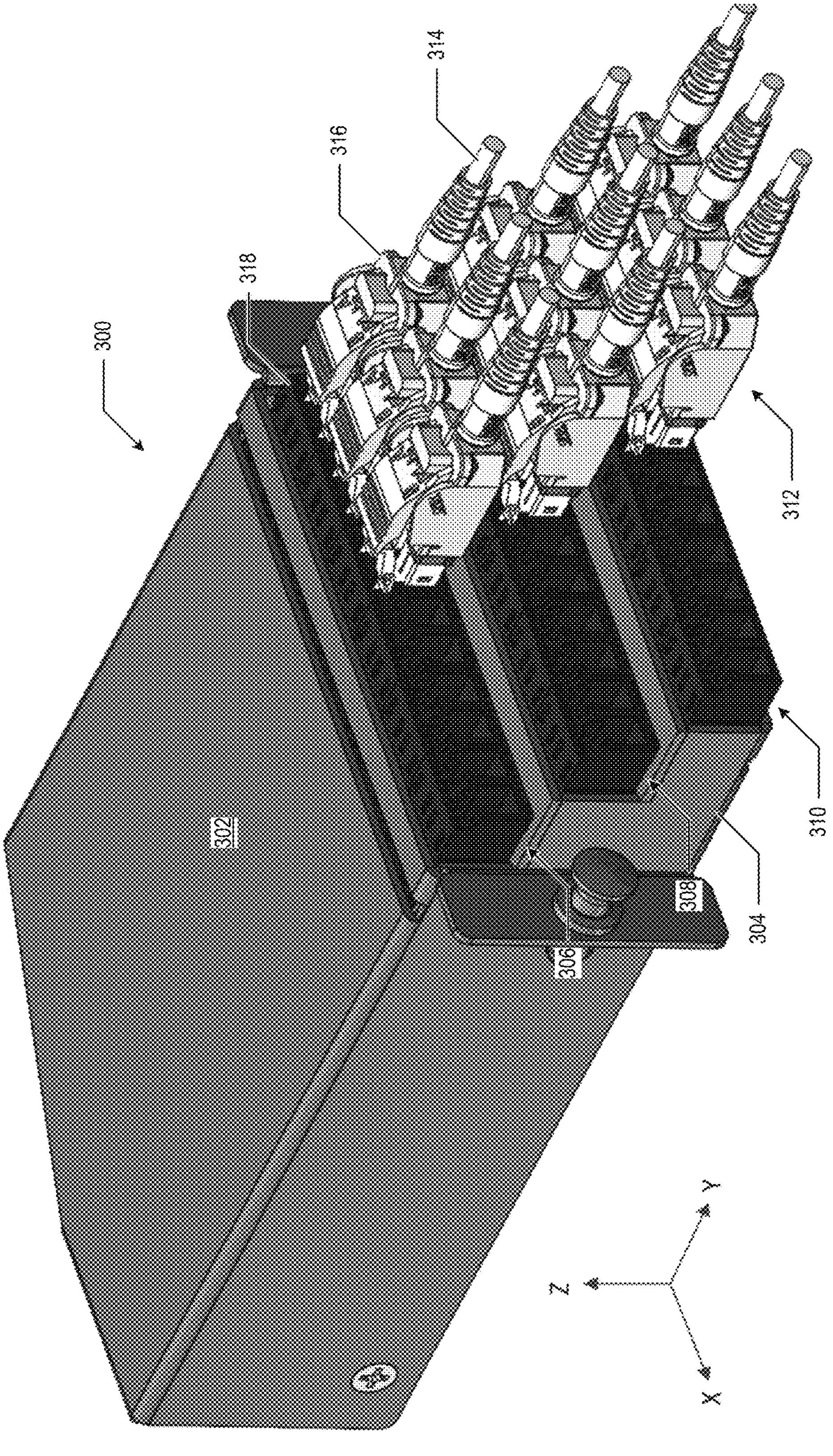
FIG. 3A, FIG. 3B, FIG. 3C, FIG. 3D, FIG. 3E, FIG. 4, FIG. 5A.

Turning to FIG. 3A, the module (300) includes the module cover (302) and the module base (304). The rows (306), (308), and (310) of module connectors are fitted within the module (300). The rows (306), (308), and (310) are rows of staggered connectors. The cables (312) may be fiber optic cables that are fitted into connectors on each of the rows (306), (308), and (310). The cable (314) is terminated with the cable connector (316), which is fitted into the module connector (318) of the row (306) of the module (300). The rows (306), (308), and (310) are staggered along the Y axis, which may also be referred to as the insertion axis. In one embodiment, the rows (306), (308), and (310) may be staggered along the X axis instead of, or in addition to, being staggered along the Y axis.

Figure 3B:
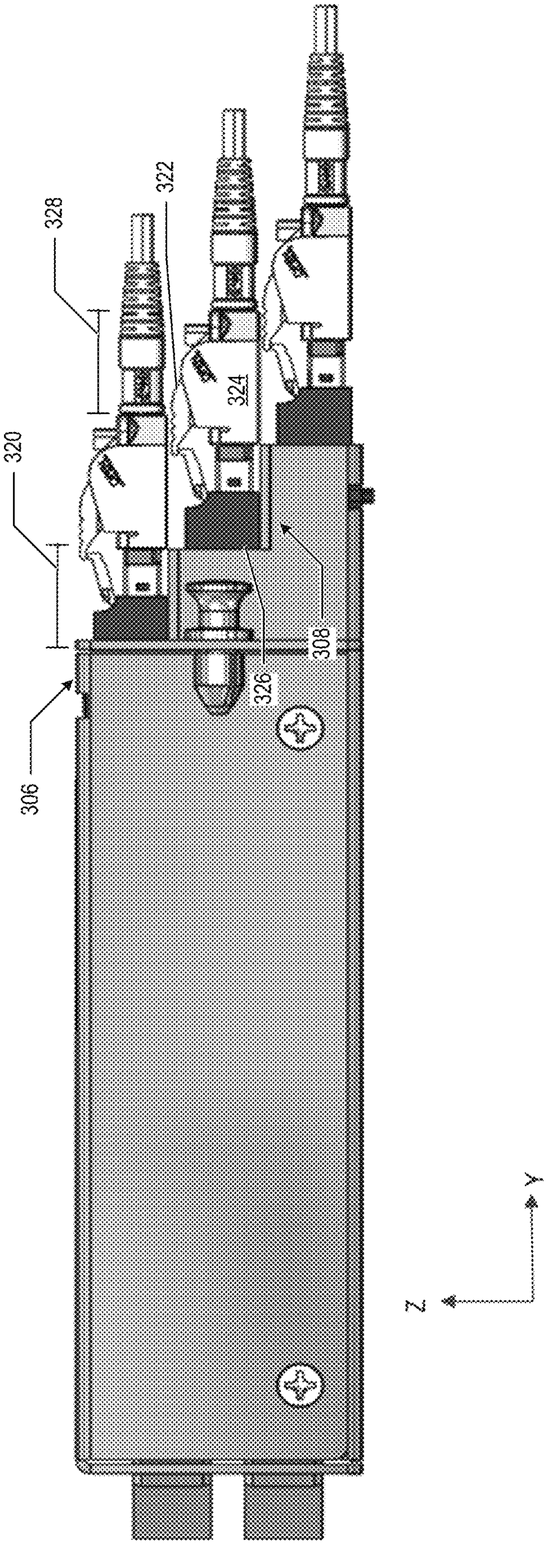

Turning to FIG. 3B, the second row (308) staggered from the first row (306) by the length (320). The stagger exposes the release mechanism (322) of the fiber connector (324) for a module connector (326) of the second row (308). The length (328) may be the same as the length (320) and is sufficient for at least partial exposure of the release mechanism (322) of the fiber connector (324) so that the release mechanism (322) may be acted upon to release the fiber connector from the module connector (326).

Figure 3C:
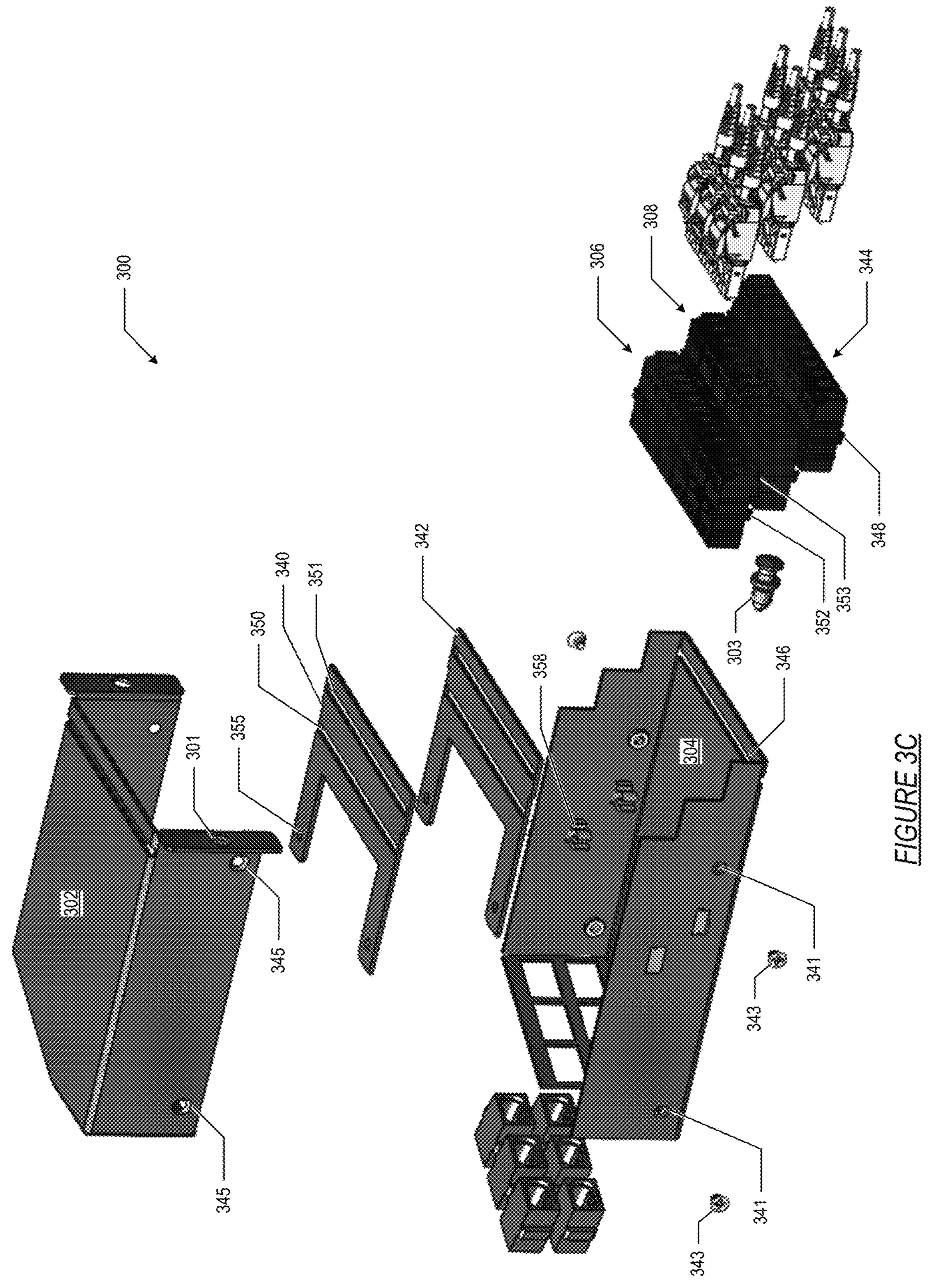

Turning to FIG. 3C, an exploded view of the module (300) shows components that may form the module (300). The restraint plate (340) fits between the first row (306) and the second row (308). The restraint plate (342) fits between the second row (308) and the third row (344). The module (300) includes the module base (304), which includes the feature (346).

In one embodiment, the feature (346) is formed as a groove punched into the module base (304). The feature (346) fits the boss features (348) of the module connectors of the row (344).

The restraint plate (340) includes the features (350) and (351) formed as grooves punched into the restraint plate (340). The feature (350) fits to the boss features (352) on the bottom of the connectors of the row (306). The feature (351) fits to the boss features (353) on the top of the connectors of the second row (308).

Figure 3D:
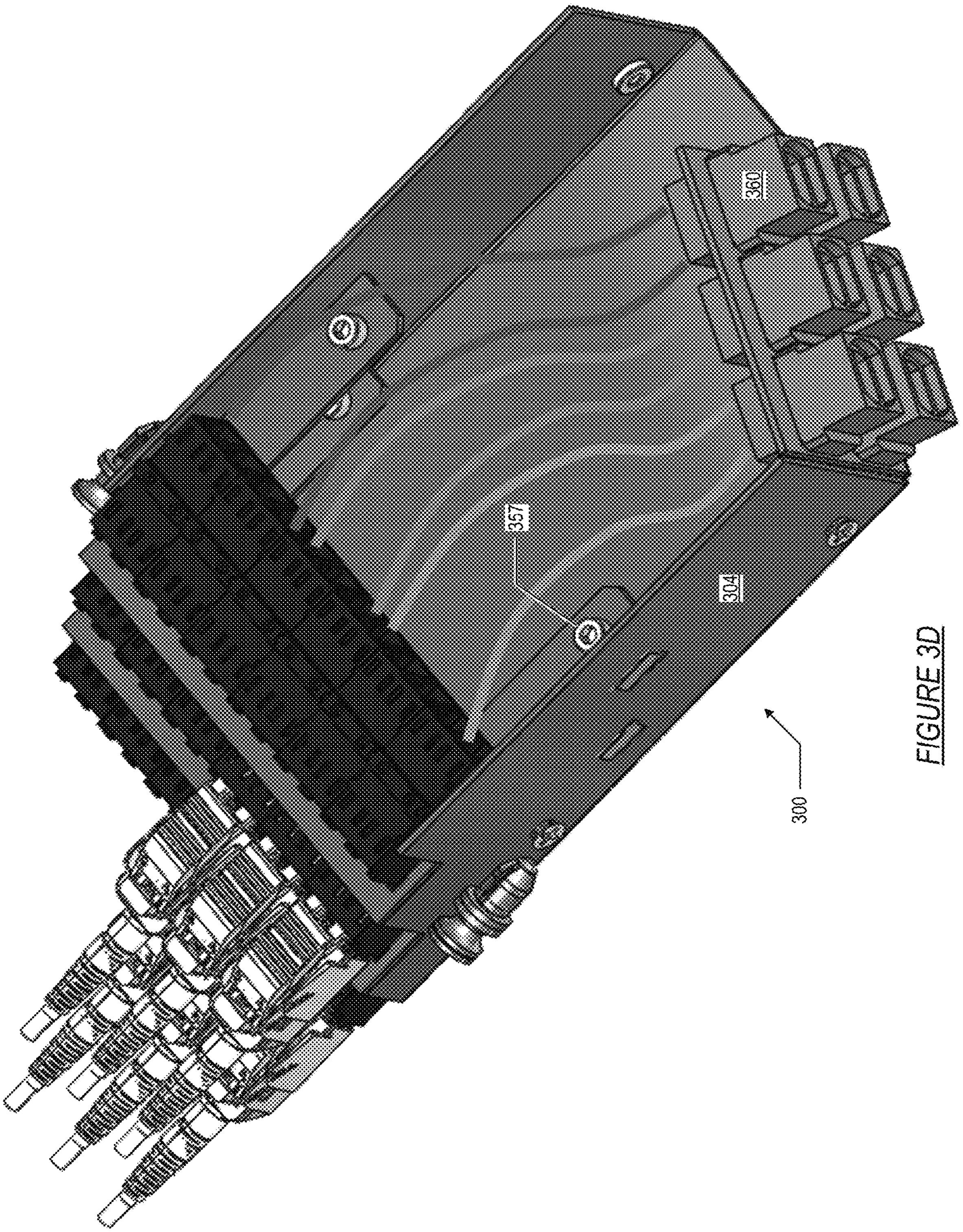

The fastening point (355) of the restraint plate (340) receives the fastener (357) (of FIG. 3D). The fastener (357)

(of FIG. 3D) secures the restraint plate (340) through the fastening point (355) to the securing member (358).

The module base (304) includes the fastening points (341). The fastening points (341) secure the module cover (302) to the module base (304) using the fasteners (343) through the fastening points (345) of the module cover.

The module cover (302) includes the fastening point (301). The fastening point (301) secures the module (300) to the panel (380) (of FIG. 3E) with the fastener (303).

Turning to FIG. 3D, a top portion of the module cover is not shown to show inside the module (300). The module (300) includes the back connector (360) connected to the module base (304). The back connector (360) is not staggered with respect to other back connectors of the module (300).

Figure 3E:
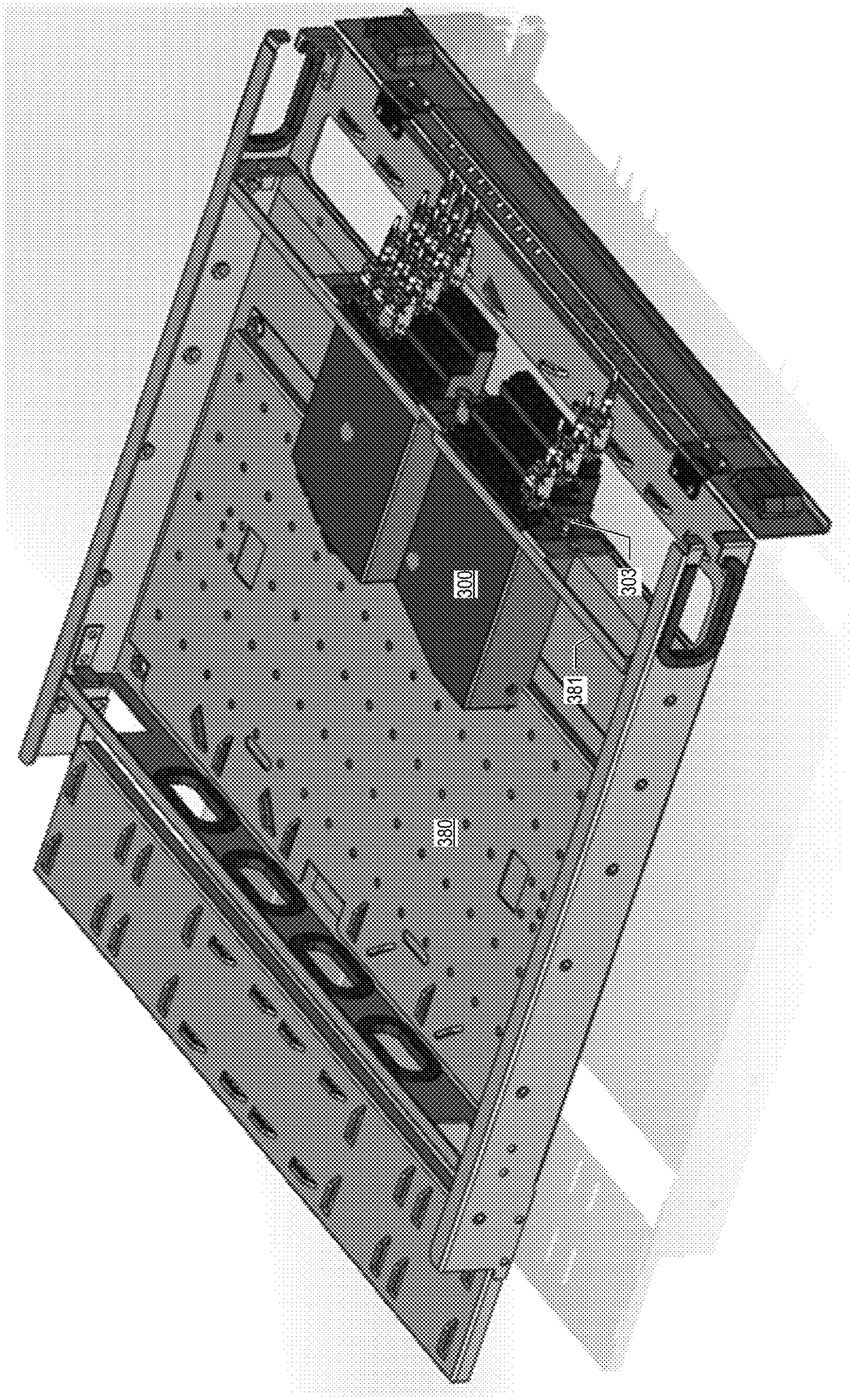

Turning to FIG. 3E, the module (300) is shown installed within the panel (380). The panel (380) is for a 1U server rack and has space for up to four modules. Different embodiments may use different numbers of modules with different widths.

The panel (380) includes the support member (381). The module (300) is secured to the support member (381) with the fastener (303)

Figure 4:
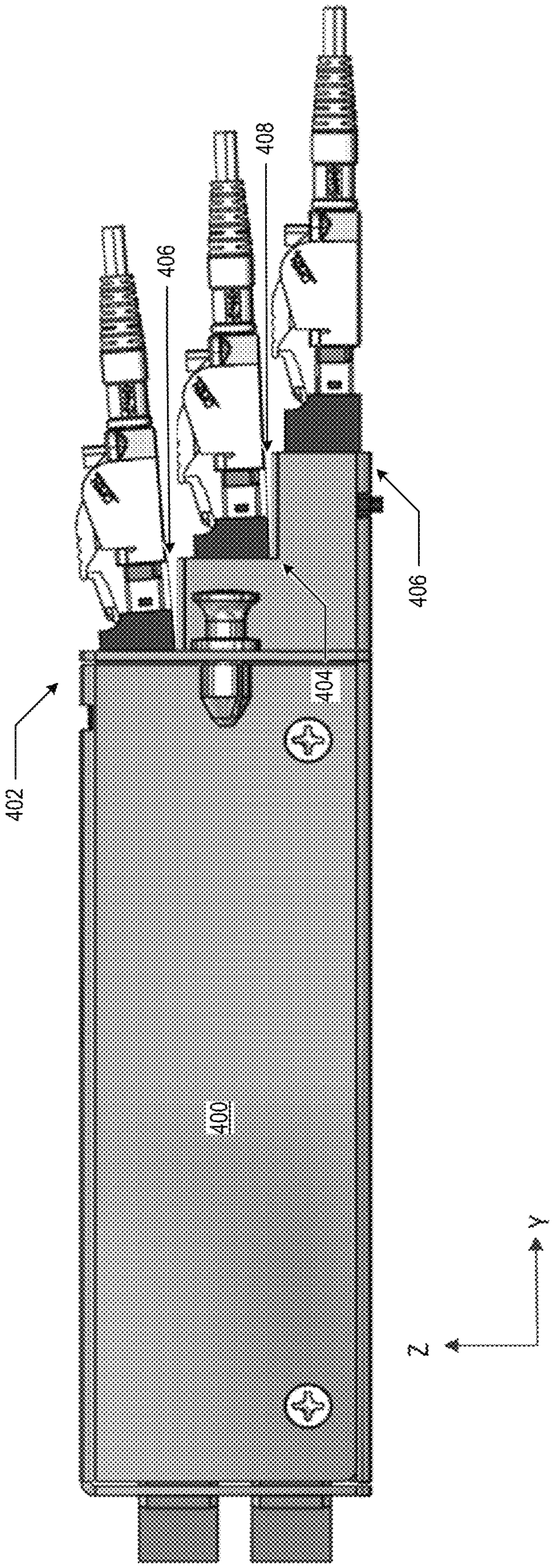

Turning to FIG. 4, the module (400) includes the rows (402), (404), and (406). The row (402) includes a first angular offset (406). The second row comprising a second angular offset (408). The first angular offset may be a multiple of the second angular offset. The first angular offset may be the same as the second angular offset. In one embodiment, the first angular offset is 5 degrees, and the second angular offset is 2.5 degrees. The first angular offset (406) and the second angular offset (408) are pitch angles that correspond to rotation of the rows of connectors in the Y-Z plane about the X axis.

Figure 5A:
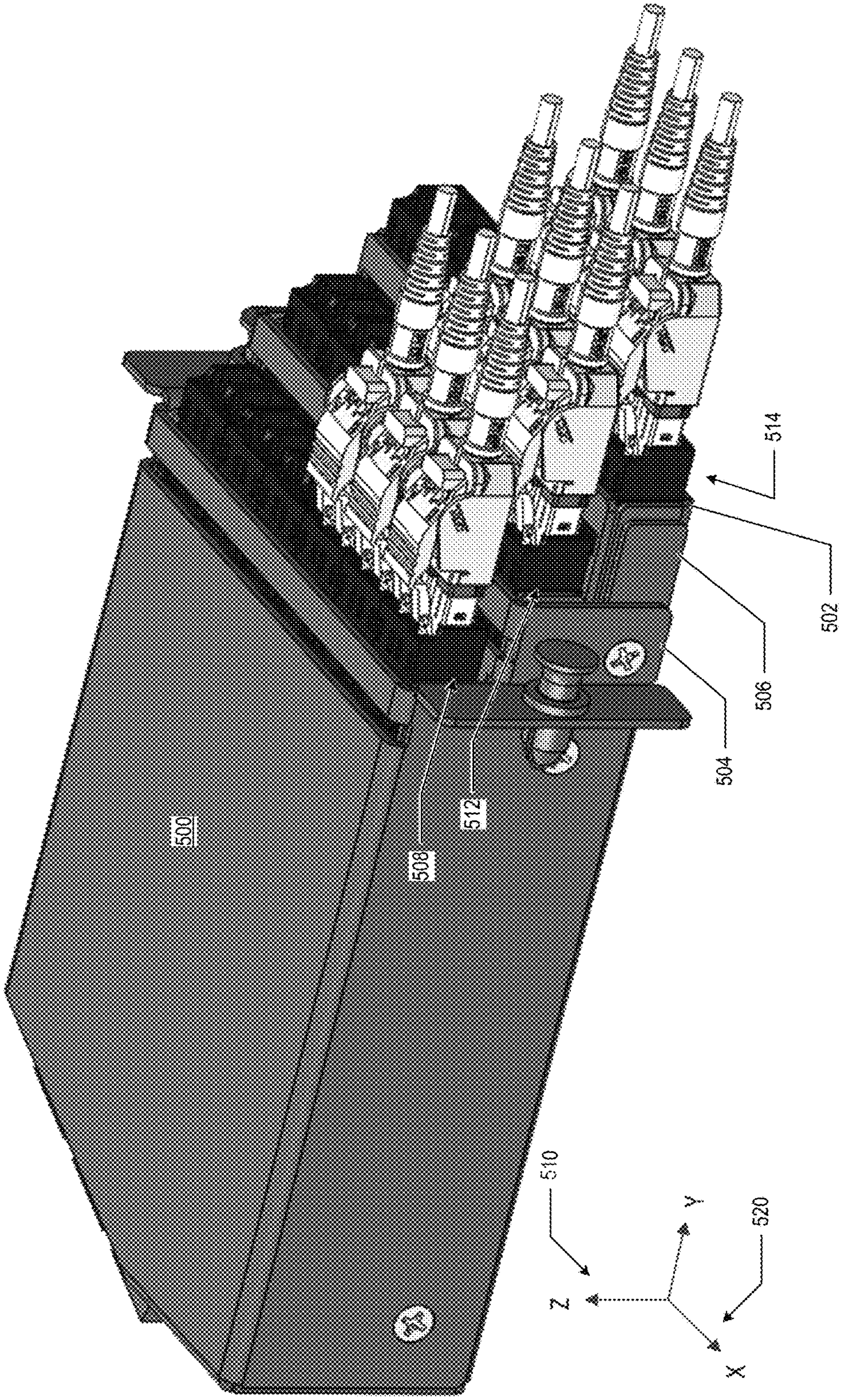

Turning to FIG. 5A, the module (500) includes the module base (502). The module base (502) is fitted with the restraint plate (504) and the restraint plate (506). In one embodiment, the row (508) (or the module connectors that form the row) may be rotated about the X axis (520) to increase spacing around the release mechanisms of the cable connectors of the row (512). In one embodiment, the row (512) (or the module connectors that form the row) may be rotated about the Z axis (510) (which may be in an opposite direction compared to the rotation of the row (508)) to increase spacing around the release mechanisms of the cable connectors of the row (514). In one embodiment, the rows (508) and (512) may also be rotated about the X axis (520) (which is shown in FIG. 2). In one embodiment, the row (512) may be rotated about the X axis (520) in an opposite direction as compared to rotation of the row (508) about the X axis (520).

Figure 5B:
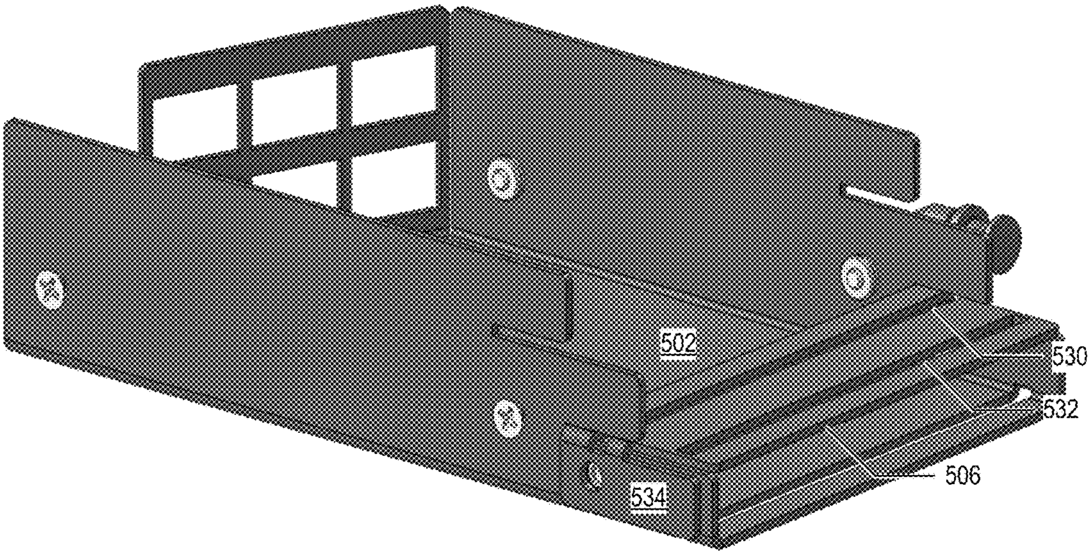
FIG. 5B, FIG. 5C, and FIG. 5D show examples of systems with staggered connectors.

Turning to FIG. 5B, the module base (502) is fitted with the restraint plate (506). The restraint plate (506) includes the feature (530) for boss features of module connectors of a row to be fitted above the module base (502). The restraint plate (506) includes the feature (532) for boss features of module connectors of a row to be fitted below and within the restraint plate (506). The restraint plate (506) includes the tab (534) folded over the module base (502). In one embodiment, the tab (534) is not fitted within the module cover (582) (of FIG. 5D).

Figure 5C:
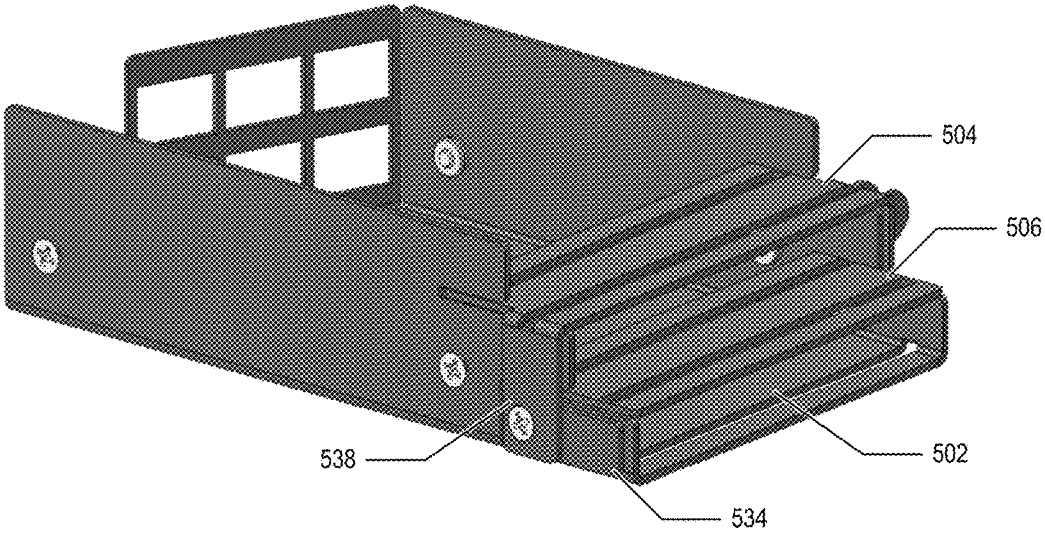

Turning to the FIG. 5C, the module base (502) is fitted with the restraint plate (504). The tab (538) of the restraint plate (504) fits outside the tab (534) of the restraint plate (506). In one embodiment, the tab (538) is not fitted within the module cover (582) (of FIG. 5D).

Figure 5D:
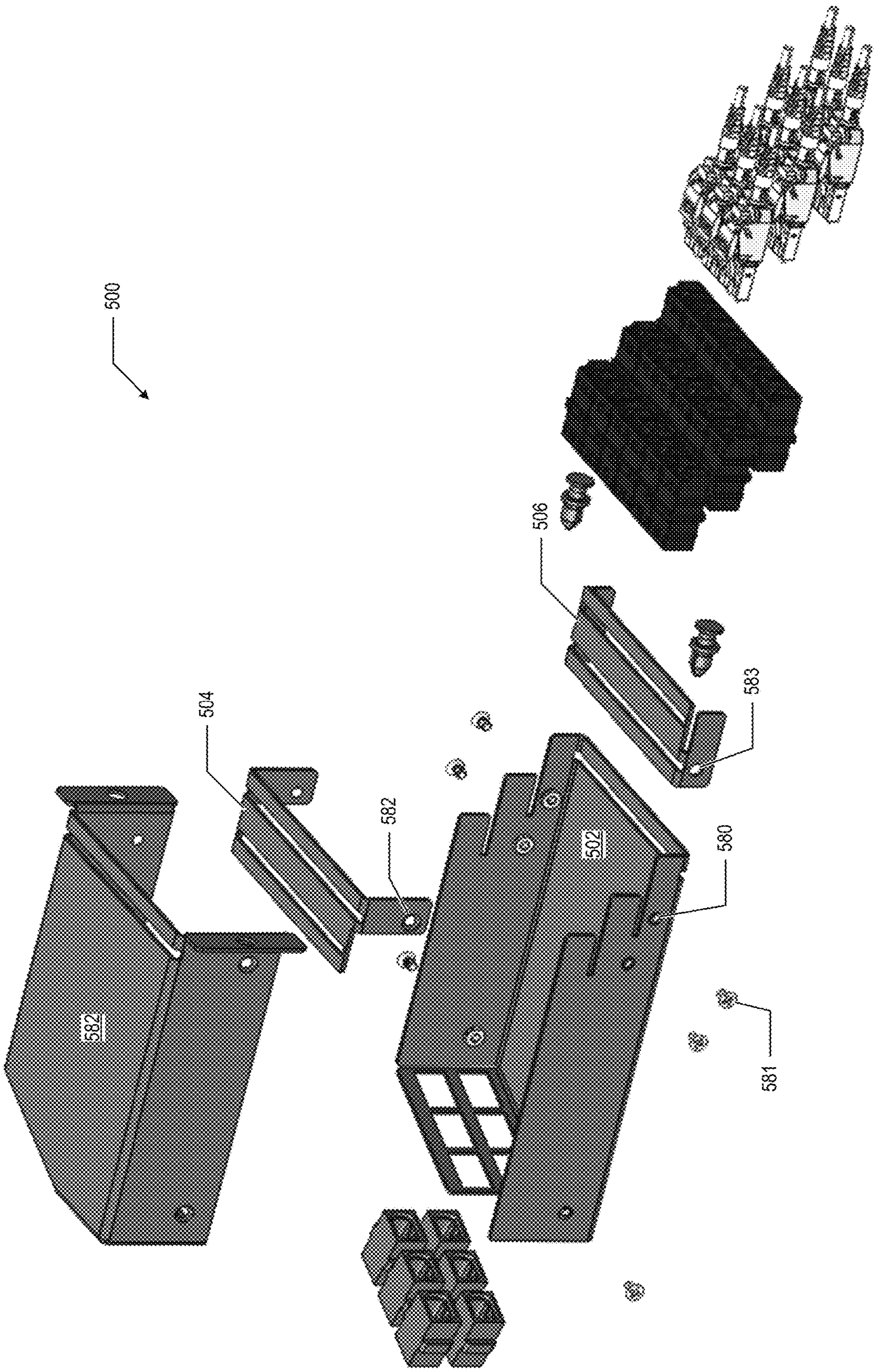

Turning to FIG. 5D, an exploded view of the module (500) shows components that may form the module (500). The fastening point (580) of the module base (502) connects the restraint plate (504), and the restraint plate (506) to the module base (502). The fastener (581) fits through the fastening point (582) of the restraint plate (504) and through the fastening point (583) of the restraint plate (506) to secure to the fastening point (580) of the module base (502). The fastening point (582) is on a flap of the restraint plate (504) that is folded over, e.g., at a right angle. The fastening point (583) is on a flap of the restraint plate (506) that is folded over, e.g., at a right angle. The module cover (582) fits to the module base (502).

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the invention should be limited only by the attached claims.

What is claimed is:

1. An apparatus comprising:

a module base of a module;

a first module connector mounted on the module base in a first row of module connectors and configured to mate with a first cable connector;

a second module connector, mounted on the module base in a second row of module connectors spaced from the first row along an insertion axis and configured to mate with a second cable connector, wherein a side of the second module connector corresponding to a release mechanism of a cable connector is oriented toward an opposite side of the first module connector;

wherein the second module connector is staggered from the first module connector along the insertion axis by a length sufficient to at least partially expose the release mechanism of the second cable connector for manual actuation while the first and second cable connectors remain mated to the first and second module connectors; and a restraint plate positioned between the first row of module connectors and the second row of module connectors, the restraint plate comprising a first retention feature engaging a lower boss feature on a module connector of the first row and a second retention feature engaging an upper boss feature on a module connector of the second row, wherein the first retention feature and the second retention feature are disposed on opposite sides of the restraint plate, and wherein a fastener extends through aligned fastening points of the module base and the restraint plate to clamp the restraint plate to the module base and retain the first row and the second row in a staggered configuration.

2. The apparatus of claim 1, further comprising:

the second module connector staggered from the first module connector by a length exposing the release mechanism of the cable connector.

3. The apparatus of claim 1, wherein the cable connector connects one of a fiber optic cable and an electrical cable to the second module connector.

4. The apparatus of claim 1, further comprising:

a rear connector of the module.

5. The apparatus of claim 1, further comprising:

a panel into which the module is connected.

6. The apparatus of claim 1, wherein the first row is offset by a first pitch angle about an axis transverse to the insertion axis relative to a plane orthogonal to the insertion axis.

7. The apparatus of claim 6, wherein the second row is offset by a second pitch angle about the axis transverse to the insertion axis, and wherein the second pitch angle is less than the first pitch angle.

8. The apparatus of claim 1, further comprising:

a second fastening point of the module base aligning with a fastening point of a second restraint plate.

9. The apparatus of claim 1, wherein:

the restraint plate is one of a plurality of restraint plates, and the fastener extends through a fastening point of the at least a second restraint plate to secure at least three rows of module connectors in a stacked staggered arrangement.

10. A system comprising:

a panel of a rack;

a module;

a first module connector within the module that is disposed in a first row of module connectors and configured to mate with a first cable connector;

a second module connector within the module that is disposed in a second row of module connectors and configured to mate with a second cable connector, wherein the second module connector is oriented with a side of the second module connector corresponding to a release mechanism of a cable connector toward an opposite side of the first module connector;

wherein the second module connector is staggered from the first module connector along an insertion axis by a length sufficient to at least partially expose the release mechanism of the of the second cable connector for manual actuation while the first and second cable connectors remain mated to the first and second module connectors; and a restraint plate positioned between the first row of module connectors and the second row of module connectors, the restraint plate comprising a first retention feature engaging a lower boss feature on a module connector of the first row and a second retention feature engaging an upper boss feature on a module connector of the second row, wherein the first retention feature and the second retention feature are disposed on opposite sides of the restraint plate, and wherein a fastener extends through aligned fastening points of a module base of the module and the restraint plate to clamp the restraint plate to the module base and retain the first row and the second row in a staggered configuration.

* * * * *